(12) United States Patent
Ates et al.

(10) Patent No.: US 11,859,304 B2
(45) Date of Patent: Jan. 2, 2024

(54) ELECTROPLATING TRANSITION METAL OXIDES

(71) Applicant: Xerion Advanced Battery Corp., Kettering, OH (US)

(72) Inventors: Mehmet Nurullah Ates, Kettering, OH (US); John David Busbee, Beavercreek, OH (US); Chadd Timothy Kiggins, Dayton, OH (US); John Berkeley Cook, Beavercreek, OH (US)

(73) Assignee: Xerion Advanced Battery Corp., Kettering, OH (US)

( * ) Notice: Subject to any disclaimer, the term of this patent is extended or adjusted under 35 U.S.C. 154(b) by 0 days.

(21) Appl. No.: 17/981,821

(22) Filed: Nov. 7, 2022

(65) Prior Publication Data

US 2023/0313404 A1    Oct. 5, 2023

Related U.S. Application Data

(63) Continuation of application No. 17/015,374, filed on Sep. 9, 2020, now Pat. No. 11,492,719, which is a
(Continued)

(51) Int. Cl.
*C25D 3/66* (2006.01)
*C25D 5/50* (2006.01)
(Continued)

(52) U.S. Cl.
CPC ............. *C25D 9/08* (2013.01); *C25D 3/665* (2013.01); *C25D 5/18* (2013.01); *C25D 5/50* (2013.01);
(Continued)

(58) Field of Classification Search
CPC .. H01M 4/045; H01M 4/0452; H01M 4/0454; H01M 4/0457; H01M 4/1391;
(Continued)

(56) References Cited

U.S. PATENT DOCUMENTS

| 3,166,615 A | 1/1965 | Farrell |
| 3,489,540 A | 1/1970 | Cook |

(Continued)

FOREIGN PATENT DOCUMENTS

| EP | 0801152 | 10/1997 |
| EP | 3172169 | 5/2017 |

(Continued)

OTHER PUBLICATIONS

Arora et al., Battery separators, Chemical Reviews, 2004, 104: 4419-4462.

(Continued)

*Primary Examiner* — Christopher P Domone
(74) *Attorney, Agent, or Firm* — Bryan Cave Leighton Paisner LLP (57) ABSTRACT

The present disclosure generally relates to a method for electroplating (or electrodeposition) a transition metal oxide composition that may be used in gas sensors, biological cell sensors, supercapacitors, catalysts for fuel cells and metal air batteries, nano and optoelectronic devices, filtration devices, structural components, and energy storage devices. The method includes electrodepositing the electrochemically active transition metal oxide composition onto a working electrode in an electrodeposition bath containing a molten salt electrolyte and a transition metal ion source. The electrode structure can be used for various applications such as electrochemical energy storage devices including high power and high-energy primary or secondary batteries.

29 Claims, 10 Drawing Sheets

Related U.S. Application Data continuation of application No. 16/143,453, filed on Sep. 27, 2018, now abandoned.

(60) Provisional application No. 62/567,228, filed on Oct. 3, 2017.

(51) Int. Cl.
| | |
|---|---|
| C25D 5/18 | (2006.01) |
| H01M 4/1391 | (2010.01) |
| H01M 4/48 | (2010.01) |
| C25D 9/08 | (2006.01) |
| C25D 5/54 | (2006.01) |
| C25D 5/00 | (2006.01) |
| C25D 5/56 | (2006.01) |
| H01M 4/04 | (2006.01) |
| H01M 10/0525 | (2010.01) |
| H01M 6/16 | (2006.01) |

(52) U.S. Cl.
CPC ............... *C25D 5/54* (2013.01); *C25D 5/56* (2013.01); *C25D 5/617* (2020.08); *H01M 4/1391* (2013.01); *H01M 4/483* (2013.01); *H01M 4/0454* (2013.01); *H01M 6/16* (2013.01); *H01M 10/0525* (2013.01)

(58) Field of Classification Search
CPC . C25D 3/665; C25D 5/50; C25D 5/54; C25D 5/18

See application file for complete search history.

(56) References Cited

U.S. PATENT DOCUMENTS

| | | | |
|---|---|---|---|
| 3,707,136 | A | 12/1972 | Kostas |
| 5,968,685 | A | 10/1999 | Harada et al. |
| 6,552,843 | B1 | 4/2003 | Tench et al. |
| 6,680,013 | B1 | 1/2004 | Stein et al. |
| 6,680,143 | B2 | 1/2004 | Thackeray et al. |
| 7,183,433 | B2 | 2/2007 | Abbott et al. |
| 8,237,538 | B2 | 8/2012 | Braun et al. |
| 9,780,356 | B2 | 10/2017 | Zhang et al. |
| 10,090,529 | B2 | 10/2018 | Arpin et al. |
| 10,886,523 | B2 | 1/2021 | Ates et al. |
| 2001/0054226 | A1 | 12/2001 | Yoshimura et al. |
| 2001/0054555 | A1 | 12/2001 | Yoshimura et al. |
| 2005/0048371 | A1 | 3/2005 | Nagayama et al. |
| 2008/0246580 | A1 | 10/2008 | Braun et al. |
| 2009/0303660 | A1 | 12/2009 | Nair et al. |
| 2010/0068623 | A1 | 3/2010 | Braun et al. |
| 2010/0151318 | A1 | 6/2010 | Lopatin et al. |
| 2010/0330425 | A1* | 12/2010 | Lopatin ............... H01M 4/0452 429/231.95 |
| 2012/0040246 | A1 | 2/2012 | Sakai et al. |
| 2012/0219844 | A1 | 8/2012 | Tsutsumi et al. |
| 2012/0301387 | A1 | 11/2012 | Neumann |
| 2013/0196235 | A1 | 8/2013 | Prieto et al. |
| 2013/0292255 | A1 | 11/2013 | Inoue et al. |
| 2014/0170303 | A1 | 6/2014 | Rayner et al. |
| 2015/0118572 | A1 | 4/2015 | Lund et al. |
| 2016/0028081 | A1* | 1/2016 | Zhang ................. H01M 4/0454 429/231.1 |
| 2017/0077490 | A1 | 3/2017 | Zhang et al. |
| 2018/0212226 | A1 | 7/2018 | Zhang et al. |
| 2019/0100850 | A1 | 4/2019 | Ates et al. |
| 2020/0274140 | A1 | 8/2020 | Zhang et al. |

FOREIGN PATENT DOCUMENTS

| | | |
|---|---|---|
| KR | 100583229 | 5/2006 |
| KR | 1020120039013 | 4/2012 |
| WO | 9705062 | 2/1997 |
| WO | WO9950479 | * 10/1999 |

OTHER PUBLICATIONS

Long et al., Three-dimensional battery architectures, Chemical Reviews 2004, 104(10), 4463-4492.

Lee et al, Synthesis and Rate Performance of Monolithic Macroporous Carbon Electrodes for Lithium-Ion Secondary Batteries, Advanced Functional Materials, 2005, 15(4): 547-556.

Zhang et al., Three-dimensional bicontinuous ultrafast-charge and -discharge bulk battery electrodes, Nature Nanotechnology, 2011, 6(5): 277-281.

Patent Cooperation Treaty, International Search Report for PCT/US2015/041515, dated Nov. 3, 2015, 4 pages.

Patent Cooperation Treaty, International Search Report for PCT/US15/41520, dated Nov. 18, 2015, 4 pages.

Gu et al., Non-aqueous electrodeposition of porous tin-based film as an anode for lithium-ion battery, Journal of Power of Sources, 2012, 214: 200-207.

Armand et al., Ionic-liquid materials for the electrochemical challenges of the future, Nature Materials, vol. 8, pp. 621-629 Jul. 24, 2009.

Chen et al., Molten Salt Synthesis and High Rate Performance of the "Desert-Rose" form of LiCoO2, Advanced Materials, vol. 20, pp. 2206-2210 2008.

Freyland, W., Chapter 2—Liquid metals, Molten Salts, and Ionic Liquids: Some Basic Properties, Coulombix Fluids, Springer Series in Sold-State Sciences 168, pp. 5-45 2011.

Gao et al., Room-temperature synthesis of crystallized LiCoO2 thin films by electrochemical technique, Journal of Alloys and Compounds, vol. 509, pp. 697-703 Jul. 7, 2010.

Han et al., Soft solution processing for fabrication of lithiated thin-film electrodes in a single synthetic step, Journal of Materials Chemistry, vol. 8(9), pp. 2043-2048 1998.

Han et al., Direct Electroplating of Lithium Cobalt Oxide Film on Platinum Substrate in 100-200C Aqueous Solution, Journal of American Ceramic Society, vol. 85[110], pp. 2444-2448 Jul. 15, 2002.

Han et al., Simultaneous and Direct Fabrication of Lithium Cobalt Oxide Film and Powder Using Soft Solution Processing at 100C, Electrochemical and Solid-State Letters, vol. 2(2), pp. 63-66 1999.

Han et al., Soft Solution Processing for direct fabrication of LiMO2 (M=Ni and Co) film, Solid State Ionics 151, pp. 11-18 2002.

Ispas et al., Electrodeposition in Ionic Liquids, The Electrochemical Society Interface, pp. 47-51 2014.

Kuk et al., The formation of LiCoO2 on a NiO cathode for a molten carbonate fuel cell using electroplating, Journal of Materials Chemistry, vol. 11, pp. 630-635 Dec. 19, 2000.

Lee et al., Fabrication of LiCoO2 films for lithium rechargeable microbattery in an aqueous solution by electrochemical reflux method, Electrochimica Acta 50, pp. 467-471 Oct. 6, 2004.

Machefaux et al., Preparation of nanowires of M substituted manganese dioxides (M=Al, Co, Ni) by the electrochemical-hydrothermal method, Journal of Physics and Chemistry on Solids, vol. 67, pp. 1315-1319 2006.

Niedermeyer, Mixtures of ionic liquids, Chemical Society Review, vol. 41, pp. 7780-7802 May 11, 2012.

Porthault et al., One step synthesis of lamellar R-3m LiCoO2 thin films by an electrochemical-hydrothermal method, Electrochimica Acta, vol. 56, pp. 7580-7585 Jul. 1, 2011.

Song et al., Effect of LiOH concentration change on simultaneous preparation of LiCoO2 film and powder by hydrothermal method, Sold State Ionics 135, pp. 277-281 2000.

Suryanto et al., Controlled electrodeposition of cobalt oxides from protic ionic liquids for electrocatalytic water oxidation, Royal Society of Chemistry RSC Advances, pp. 20936-20942 Sep. 2, 2013.

Tao et al., Synthesis mechanism of lithium nickel oxide using hydrothermal-electrochemical method: Thermodynamic modelling and experimental verification, Physica B 362, pp. 76-81 Jan. 30, 2005.

Zhou et al., Electrodeposited McOx Films from Ionic Liquid for Electrocatalytic Water Oxidation, Advanced Energy Materials, vol. 2, pp. 1013-1021 2012.

(56) References Cited

OTHER PUBLICATIONS

European Patent Office, Extended European Search Report issued for App. No. 15825174.4; Pub. No. 3172169, 10 pages dated Jan. 5, 2018.
European Patent Office, Extended European Search Report issued for App. No. 21185385.8, 10 pages dated Jan. 25, 2022.
Zhang et al.. Strongly coupled carbon nanofiber-metal oxide coaxial nanocables with enhanced lithium storage properties, Energy Environ. Sci., 7: 302-305 2014.

* cited by examiner

ELECTROPLATING TRANSITION METAL OXIDES

CROSS REFERENCE TO RELATED APPLICATIONS

This application is a continuation of U.S. patent application Ser. No. 17/015,374 filed on Sep. 9, 2020, which is a continuation of U.S. patent application Ser. No. 16/143,453 filed on Sep. 27, 2018, which claims the benefit of, and priority to, U.S. provisional patent application Ser. No. 62/567,228 filed on Oct. 3, 2017, incorporated herein by reference in its entirety. This application is related to U.S. patent application Ser. No. 15/362,993 entitled LITHIATED TRANSITION METAL OXIDES, issued on Oct. 3, 2017 as U.S. Pat. No. 9,780,356, incorporated herein by reference in its entirety.

FIELD OF THE INVENTION

The present disclosure generally relates to a method for electroplating (or electrodeposition) a transition metal oxide composition that may be used in gas sensors, biological cell sensors, supercapacitors, catalysts for fuel cells and metal air batteries, nano and optoelectronic devices, filtration devices, structural components, energy storage devices such as primary and secondary batteries. Transition metal oxides can also be used to coat battery electrodes to make Li batteries safer at high voltages. In one such exemplary embodiment, the transition metal oxide composition is an anodically active or a cathodically active material and is incorporated into a monolithic porous open-cell structure adapted for use as, or as a component of, a primary or secondary battery. The present disclosure also describes how to manufacture highly pure metal oxide as a final product using low purity starting precursors. Using less refined, lower purity precursors, the present invention can reduce the final cost of the metal oxide. The method proposed herein demonstrates that high purity traditional transition metal oxides (TMOs) that perform as good as or in some cases better than TMOs can be synthesized and formed into an electrode from starting materials with purities as low as 50%. This technology should enable the direct use, or preliminary purifications, of some common ores of transition metals (TM).

BACKGROUND OF THE INVENTION

Lithium ion batteries (LIBs) have spurred great interest in the realm of energy crisis owing to their high energy densities. They are comprised of a cathode, which host Li ions, a Li$^+$ containing electrolyte submerged into a separator and an anode in which Li ions can be inserted into and de-inserted from. LIBs are ubiquitous devices where they find useful applications ranging from watches, cell phones, laptops and electric vehicles. In a commercial LIB, graphite has been used as an anode where Li ions can be inserted at around 0.1-0.2V (versus Li$^+$/Li). In a typical commercial LiCoO$_2$ electrode if coupled with graphite anode delivers an average output potential of 3.7V. This electrode configuration is one of the most widely used battery architecture in the LIB market. Graphite anodes, however are limited with a specific capacity (350 mAh/g) where next generation LIBs will require high density anode active materials. For this particular reason, metal oxides are promising alternatives for anode applications in LIBs. They exhibit three times higher specific capacities (1200 mAh/g) than that of the commercially available anodes (see *Shijiao Sun, Xiangyu Xhao, Meng Yang, Zhaoyin Wen, Xiaodong Shen, Hierarchically ordered mesoporous Co3O4 materials for high performance li-ion batteries, Scientific Reports* 6, Article number 19564, 2016). Although a LIB consisting of Co based metal oxide anode delivers a low output potential (2V), this feature has attracted chip and optic industries where lower operating voltages are required in order to protect electronics. It is also plausible to increase the output potential with Mn based metal oxide as an anode active material.

Transition metal oxides are long sought alternative anode active materials for lithium ion batteries owing to their high capacities. Myriad of methods have been tried to manufacture transition metal oxides. Conventional techniques such as wet chemical processes, solid state synthesis, hydrothermal, vapor-based depositions, electrodeposition in aqueous media have all been used to obtain metal oxides. For example, Z.-S. Wu, W. Ren, L. Wen, L. Gao, J. Zhao, Z. Chen, G. Zhou, F. Li and H.-M. Cheng, *ACS Nano*, 4, 3187 (2010) reported Co$_3$O$_4$ anode material prepared by a wet chemical process. Their material showed drastic capacity fade even after 10 cycles due to volume expansion and low conductivity. In addition, the reported method is time consuming and economically not viable for large scale production. Their reported poor electrochemical performance is also another bottleneck. Furthermore, this synthesis technique has a multi-step protocol in which the final material has to be mixed with other additives such as carbon, binder which is usually followed by coating the active particles via slurry casting machines. These steps require rigorous care and minor mistakes can cost money and time.

SUMMARY OF THE INVENTION

In the present invention, a new technique is described, which is both time and cost effective, and delivers good electrochemical performance. The present invention eliminates the use of conductive carbon and binder additives and solely relies on a highly pure active material plated on a 3D substrate or planar electrode. Compared to traditionally manufactured TMO's requiring high temperature processes, this method can be used to synthesize active material with a mild heat treatment (e.g., a 2 h treatment at 450° C. under atmospheric conditions), or even without any heat treatment at all. Both of these advantages greatly reduce the cost of the final product. Even without heat treatment, due to low temperature environment one can get less crystalline, but highly nano-sized final particles with desired structure. Furthermore, unlike the conventional way of making metal oxides, high purity of starting precursors can be substituted with low purity precursors (down to 50% purity), which decreases the cost of the final metal oxide product.

In general, the present invention discloses a method of electrodepositing a transition metal oxide, doped transition metal oxide or sodiated transition metal oxide onto the surface of a working electrode comprising the steps of:
    (a) immersing a working electrode into a molten salt electrolyte comprising a transition metal ion source in the presence of an inert atmosphere,
    (b) electrodepositing an electrochemically active transition metal oxide onto a surface of the working electrode from the molten salt electrolyte at a temperature in excess of the melting temperature of the molten salt electrolyte,
    (c) removing the working electrode from the bath,
    (d) rinsing the electrodeposited transition metal oxide,
    (e) followed by heat treatment of the electrodeposited transition metal oxide.

In a preferred embodiment, the transition metal oxide is $Co_3O_4$, $CoO$, $MnO_2$, $Mn_2O_3$, $Mn_3O_4$ or mixture of Mn and Co metal oxide $Mn_xCo_yO_z$ where x, y and z range from 0.1 to 4.

The molten salt electrolyte can comprise a hydroxide salt, a halide salt, a nitrate salt, a sulfate salt or a combination thereof. Preferably, the molten salt electrolyte comprises a hydroxide salt selected from the group consisting of NaOH, KOH, and mixtures thereof.

In a preferred embodiment the molten salt comprises NaOH and $Co(OH)_2$ the electrodeposited transition metal oxide is $Na_xCo_yO_2$, wherein x is between 0.1 to 1 and y is between 1 to 0.1. In another preferred embodiment, molten salt comprises NaOH and $MnCl_2$, and the electrodeposited transition metal oxide is $Na_xMn_yO_2$, wherein x is between 0.1 to 1 and y is between 1 to 0.1.

The electrodeposited transition meal oxide is preferably conformally coated onto the working electrode. In a preferred embodiment, the working electrode is a porous nanostructured component and the transition metal oxide is conformally coating onto the porous nanostructured component. The working electrode used for electrodeposition of the transition metal oxides can also be porous with 3D interconnected pore structures.

The thickness of the electrodeposited transition metal oxide preferably ranges from about 10 nm to about 100 nm. The electrodeposited transition metal oxide material can also be in the form of a powder, and wherein the powder can be scraped off.

The electrodeposition is carried out at relatively low temperatures ranging from 150° C. to 600° C. Preferably, the electrodeposition temperature is from about 300° C. to about 500° C.

In another embodiment of the present invention, the method of electrochemical deposition of transition metal oxides, doped transition metal oxides and sodiated transition metal oxide, comprises the steps of: making a plating bath, comprising NaOH, KOH, or fused melts of an NaOH/KOH eutectic mixture, dissolving a transition metal, providing a conductive substrate, and depositing an electrochemically active transition metal oxide material on the substrate at relatively low temperatures ranging from 150° C. to 600° C. The conductive substrate used for electrodeposition preferably comprises at least one of nickel, tungsten, copper, gold, platinum, titanium, and carbon. In a preferred embodiment, the conductive substrate used for electrodeposition is porous with 3D interconnected pore structures.

One of the embodiments of this invention was demonstrated by synthesizing $Co_3O_4$ particles. In this example, three-dimensional stainless-steel fibers (SSF) were used as the working electrode. In order to obtain conformal coating of each fiber with $Co_3O_4$, Applicants' electroplating method is applied, which will be detailed later. These fibers cannot be coated conformally with conventional methods such as slurry casting. One way to synthesize $Co_3O_4$ conformaly on a 3D substrate has been demonstrated via aqueous media electrodeposition methods. (see Spataru, N.; Terashima, C.; Tokuhiro, K.; Sutanto, I.; Tryk, D. A.; Park, S.-M.; Fujishima, A. J. Electrochem. Soc. 2003, 150, E337) However, this method has the drawback of nonuniform coating and isolated particles at the edges of substrate. These problems prevent the use of such methods to scale up at industrial levels. Electroplating in non-aqueous molten salts are on the other hand offers better ionic conductivity and better ion diffusion. High surface area of the 3D substrates provides enhanced Li-ion transportation due to better electrode-electrolyte interface. The interior pores of SSF provide free void spaces to suppress structural strain as a result of Li insertion/extraction processes. Thus, unlike other studies such as the ones reported by G. Huang, S. Xu, S. Lu, L. Li, H. Sun, ACS Applied Materials & Interfaces, 6, 7236 (2014), Y. Fan, H. Shao, J. Wang, L. Liu, J. Zhang, C. Cao, Chemical Communications, 47, 3469 (2011), Y. Li, B. Tan, Y. Wu, Nano Letters, 8, 265 (2008), X. W. Lou, D. Deng, J. Y. Lee, J. Feng, L. A. Archer, Advanced Materials, 20, 258 (2008) and N. Yan, L. Hu, Y. Li, Y. Wang, H. Zhong, X. Hu, X. Kong, Q. Chen, The Journal of Physical Chemistry C, 116, 7227 (2012), significantly better cycle life and relatively stable voltage responses are easily achieved. The synthesis temperature of the metal oxide is as low as 150° C. This enables the formation of uniform, crack free, interconnected $Co_3O_4$ nano-flakes which directly adhere to the substrate. Of particular significance is that this technique renders the ability to control crystallinity, morphology and surface area of the active materials by just adjusting the electrodeposition parameters such as applied potential and interval time between each pulse.

DETAILED DESCRIPTION OF THE INVENTION

Electroplating of a transition metal oxide (TMO) was carried out using a 3-electrode system where a working electrode, a counter (Ni foil), and a pseudo reference (Co metal) electrode were immersed into a eutectic solution, which is also called a molten salt, containing a transition metal ion source.

The transition metal ion source can be aluminum, copper, chromium, cobalt, manganese, nickel, silver, gold, tin, platinum, zinc, tungsten, tantalum, rhodium, molybdenum, titanium, iron, zirconium, vanadium, hafnium, and the alloys thereof. The transition metal ion source in the plating bath can further comprise at least one of an oxide doping agent selected from the group consisting of $Al_2O_3$, $AlOH_3$, and combinations thereof.

The working electrode can be an electrically conductive material selected from the group consisting of electrically conductive carbon, metal, metal alloys, metallic ceramics, oxides, polymers, and combinations thereof. Preferably, the working electrode is an electrically conductive metal selected from the group consisting of aluminum, copper, chromium, cobalt, manganese, nickel, silver, gold, tin, platinum, zinc, tungsten, tantalum, rhodium, molybdenum, titanium, iron, zirconium, vanadium, hafnium, and the alloys thereof.

The eutectic system can provide a relatively low synthesis temperature. The eutectic temperature is known as the melting point which is lower than any composition made up of the mixture. Above the eutectic temperature, the liquid phase is generally called molten salt. In the present invention, the term of molten salt system is used to define all liquid phases including eutectic composition. For electrodepositing on a working electrode, a molten salt system should have low temperature to protect the working electrode and possess high solubility of transition metal sources. Low-temperature molten salt is usually selected by checking the eutectic points in the phase diagrams. The molten salt bath is prepared with at least one of the following chemicals: including hydroxides (KOH, NaOH, RbOH, CsOH etc), halides (KF, KCl, NaCl, NaF, NaBr, KBr, NaI, KI, $AlCl_3$ etc), nitrates ($NaNO_3$, $KNO_3$), nitrites ($NaNO_2$, $KNO_2$), and sulfates ($Na_2SO_4$, $K_2SO_4$). A Ni crucible was used as the reaction vessel and a glass lid was used to hang abovementioned electrodes into the eutectic solution. All three electrodes were connected to a power supply which provides sufficient voltage or current densities where electrochemically active transition metal oxide materials were produced. These materials are of great interest to the battery, optic, catalyst, sensor and supercapacitor industries.

Figure 1:
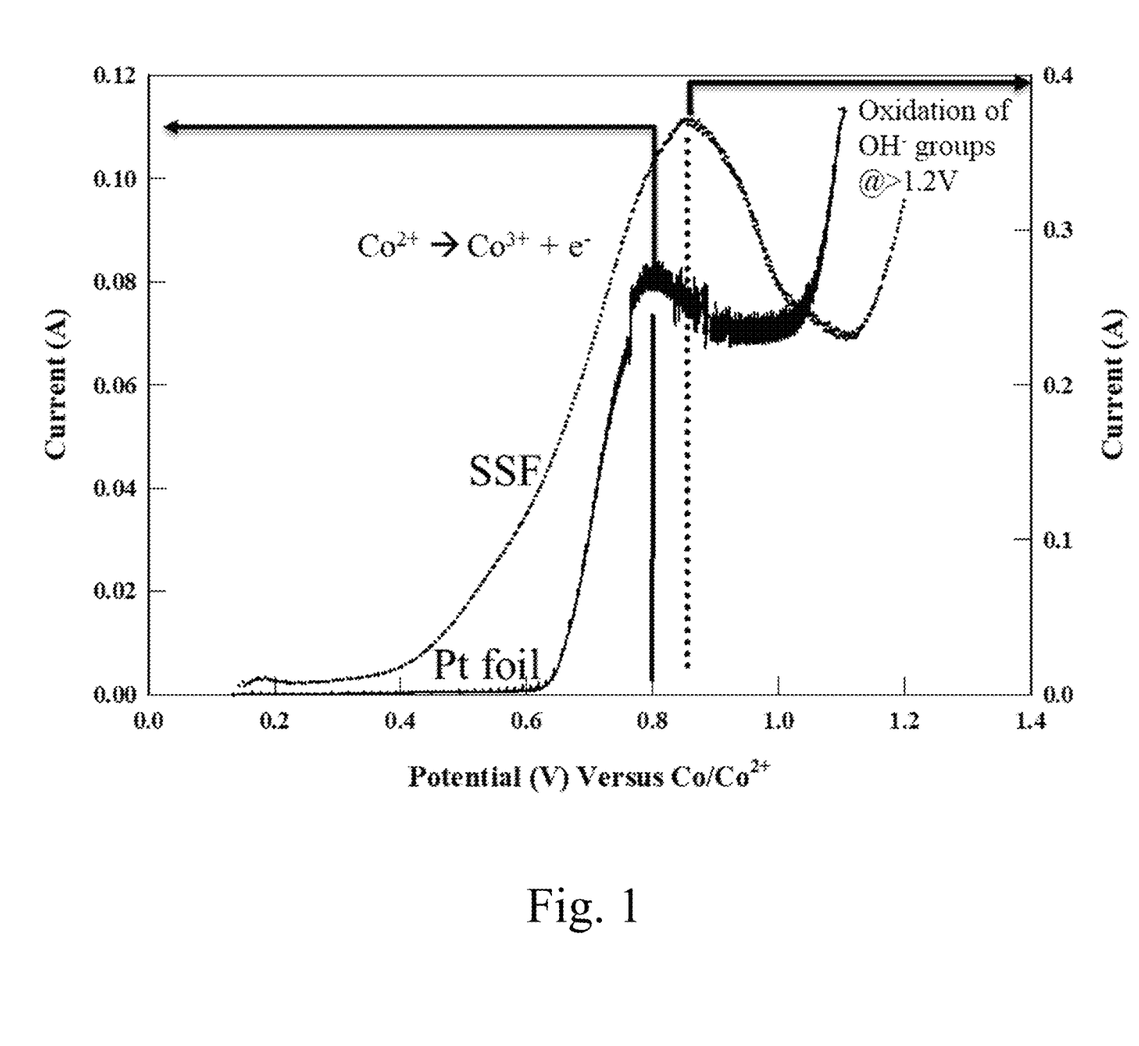
FIG. 1. Cyclic voltammetry of NaOH/KOH bath containing $Co(OH)_2$ at 5 mV/s scan rate at 170° C. Peak broadening when SSF is used as working electrode is due to high surface area of SSF. Two current scales were drawn for comparison.
Figure 2A:
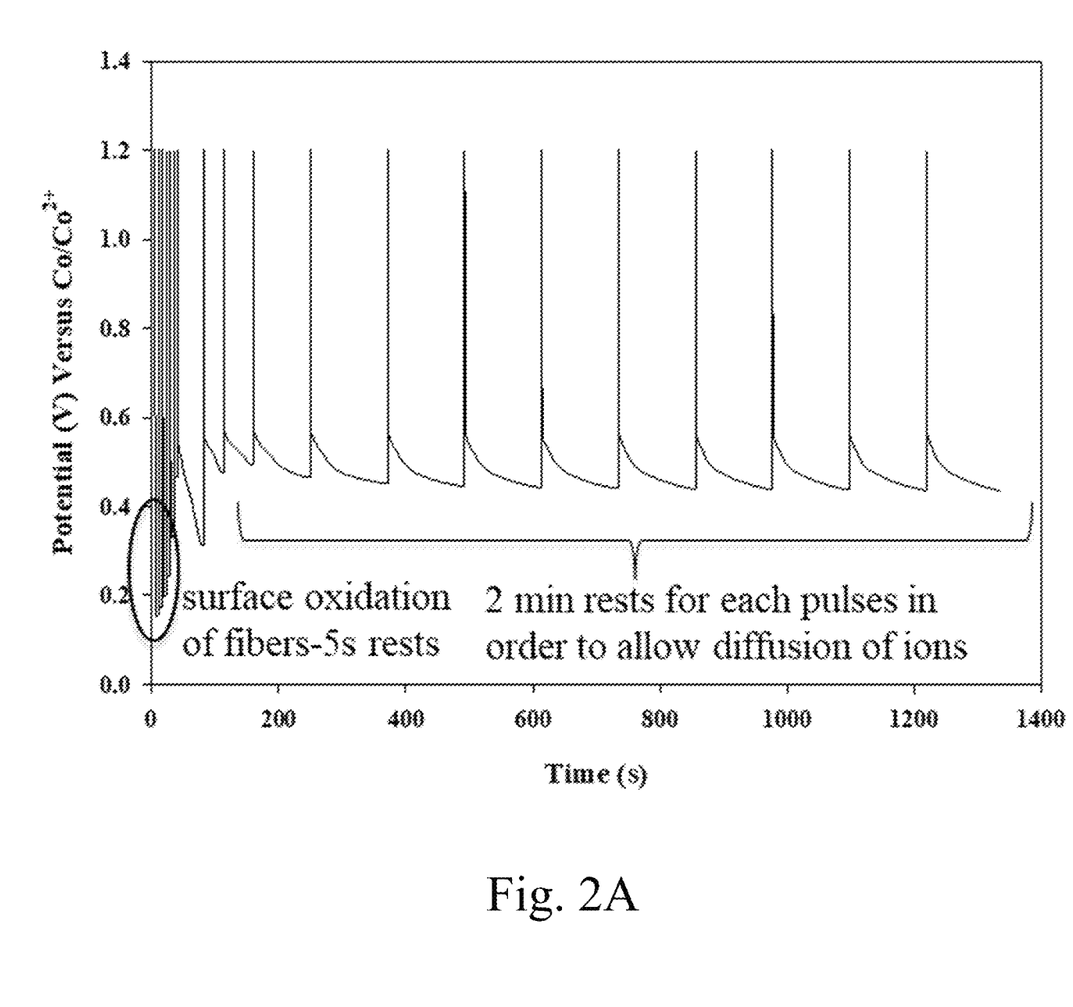
FIG. 2A. Voltage pulses and open circuit voltage (OCV) recorded in each cycle.
Figure 2B:
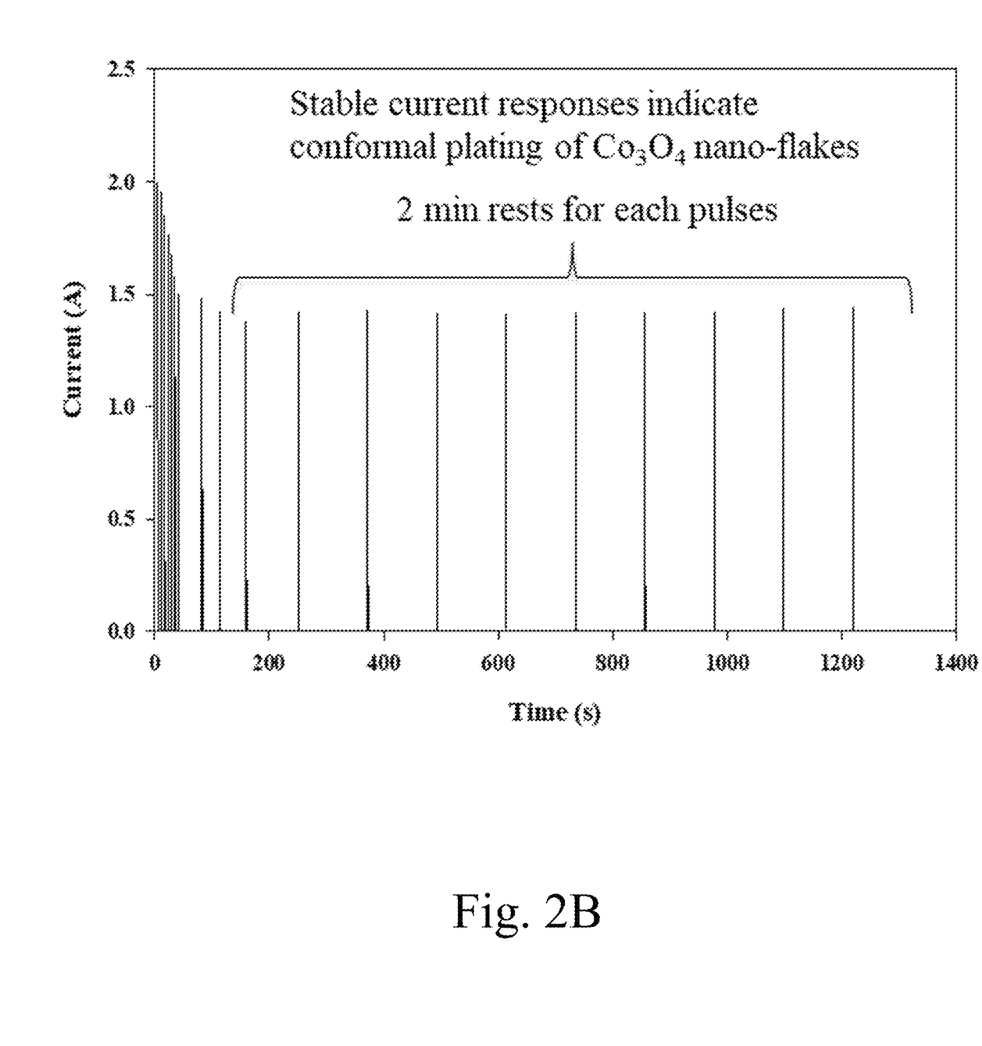
FIG. 2B. Current responses obtained from voltage pulses.

FIG. 1 shows the Cyclic voltammetry (CV) of a molten salt system (KOH/NaOH eutectic mixture) which contains $CoOH_2$ (98% purity) species. The working electrode is employed as both SSF and Pt foil to evaluate if there are any impurities possibly dissolving from SSF that can be deposited. As can be seen from the CV profiles, in both cases $Co^{2+}$ ions are being oxidized at relatively similar potentials i.e. above 0.6V. For SSF case, the broad oxidation peak is due to the high surface area of the fibers compared to Pt foil. Both profiles resemble each other smoothly suggesting that no impurities are present in the fibers. The sharp peak appearing at around 1.2V is due to the oxidation of OH– groups originating from KOH and LiOH salts, which are the major components of the molten salt. From these results, Applicants demonstrated that starting with 0.6V, any voltage pulses up to 1.4V will produce $Co_3O_4$ nano-flakes. Low potential (e.g. 0.6-0.7V) pulses will require longer on-time while high potential (e.g. 1.4V) needs less on-times. Applicants find the optimum voltage pulse to be 1.2V with 1 s on-time. All voltage values are reported versus $Co/Co^{2+}$ pseudo reference electrode. During electroplating, the rest time is crucial as this affects the conformal coating of SSF with $Co_3O_4$ nano-flakes. As can be seen from FIGS. 2A and 2B, approximately 2 minutes rest time between each voltage pulse was sufficient to allow $Co^{2+}$ ions to diffuse to the pores of the SSF. Stable current responses in FIG. 2B are an essential indicator of conformal $Co_3O_4$ deposition. If the rest time is less than 2 minutes, the OCV readings would rise and current responses would diminish which would lead to non-conformal coating and surface clogging of $Co_3O_4$ electrode which are parameters that would lead to catastrophic electrochemical failure of the cell.

The molten salt bath temperature typically is around 150-170° C. which is achieved by mixing NaOH and KOH salts. The molar ratio of NaOH/(NaOH+KOH) was 0.515 in order to get to the eutectic point. One can still melt the salt mixture with different molar ratio at the expense of increasing the temperature. The eutectic mixture can be also reinforced by using CsOH and/or RbOH to extend low temperature solubility of molten salt. It should be also noted if the molten salt is achieved by only melting NaOH, the final product will form sodiated metal oxides which are receiving great attention as they can be used as cathode materials for Na-ion batteries. See, for example, Yasuhiko-Takahashi, YoshitoGotoh, JunjiAkimoto, Single-crystal growth, crystal and electronic structure of NaCoO2, Journal of Solid State Chemistry Volume_172, Issue 1, April 2003, Pages 22-26, incorporated by reference herein. The Co source could be CoO, $CoOH_2$, $CoCl_2$, $CoSO_4$, or $Co(NO_3)_2$ salts. In one example, 110 g of KOH, 50 g NaOH, and 8 g $CoOH_2$ are added to the bath and monitored until they are dissolved thoroughly. The color of the melt changed from transparent color to blue as the divalent $Co^{2+}$ ions are coordinated by hydroxide ions. This is followed by immersing the 3-electrode lid into the molten salt. Afterwards, 1.2V (versus cobalt wire reference electrode) potential pulses were applied. The pulse range is from 100 µs to 20 s where a SSF, Ni foil and Co wire are used as working, counter, and pseudo reference electrodes, respectively. Between pulses, there was an open circuit voltage period (ranging from 3 s to 2 minutes). This resting period allows ions to move into the voids of SSF, so that conformal deposition can be achieved. The number of deposition cycles (duty cycle refers to on/off time) determines the loading of the sample. Constant voltage or current densities will also lead to the formation of the metal oxide; however, the electroplated material will not cover the 3D substrate conformally. Nevertheless, one can use this method to obtain powder form of the metal oxide. In Li-ion battery language, the Li ion insertion voltage is defined as the lithiation potential. The lower the lithiation potential for an anode material, the better output potential for a battery would be. This is because overall voltage of a battery is given by the equation of $V_{cell}=V_{cathode}-V_{anode}$. By simply changing the transition metal to a Mn source, one also can produce $Mn_3O_4$ material which has lower lithiation potential leading to higher voltage outputs in a full cell configuration.

To obtain Al doped $Co_3O_4$, in one example, 110 g of KOH, 50 g NaOH, 8 g $CoOH_2$, and 0.4 g $Al_2O_3$ or $AlOH_3$ were added to the bath and monitored that they were dissolved thoroughly. Afterwards, 1.2V (versus cobalt wire reference electrode) potential pulses were applied. The pulse range is from 100 µs to 20 s where a SSF, Ni foil and Co wire are used as working, counter and pseudo reference electrodes, respectively. Between pulses, there was an open circuit voltage period (ranging from 3 s to 2 minutes). This resting period allows ions to move into the voids of SSF thereby conformal deposition is achieved. To obtain Mg doped $Co_3O_4$, 110 g of KOH, 50 g NaOH, 8 g $CoOH_2$, and 0.4 g $MgOH_2$ were added to the bath and monitored that they were dissolved thoroughly. Afterwards, 1.2V (versus cobalt wire reference electrode) potential pulses were applied. The pulse range is from 100 μs to 20 s where a SSF, Ni foil and Co wire are used as working, counter and pseudo reference electrodes, respectively. Between pulses, there was an open circuit voltage period (ranging from 3 seconds to 2 minutes). This resting period allows ions to move into the voids of SSF thereby conformal deposition is achieved. To obtain Mn and Co co-plated $MnCo_2O_4$, 110 g of KOH, 50 g NaOH, 4 g $CoOH_2$, and 2 g $MnCl_2$ were added to the bath and monitored that they were dissolved thoroughly. Afterwards, 1.2V (versus cobalt wire reference electrode) potential pulses were applied. The pulse range is from 100 μs to 20 s where a SSF, Ni foil and Co wire are used as working, counter and pseudo reference electrodes, respectively. Between pulses, there was an open circuit voltage period (ranging from 3 s to 2 minutes). This resting period allows ions to move into the voids of SSF thereby conformal deposition is achieved. Different ratio of Mn, Co will lead different stochiometric of $Mn_xCo_yO_z$ product. See for example, Guoyong Huang, Shengming Xu, Zhenghe Xu, Hongyu Sun and Linyan Li, Core-Shell Ellipsoidal MnCo2O4 Anode with Micro-/Nano-Structure and Concentration Gradient for Lithium-Ion Batteries, ACS Appl. Mater. Interfaces, 2014, 6 (23), pp 21325-21334, incorporated herein by reference.

Figure 3:
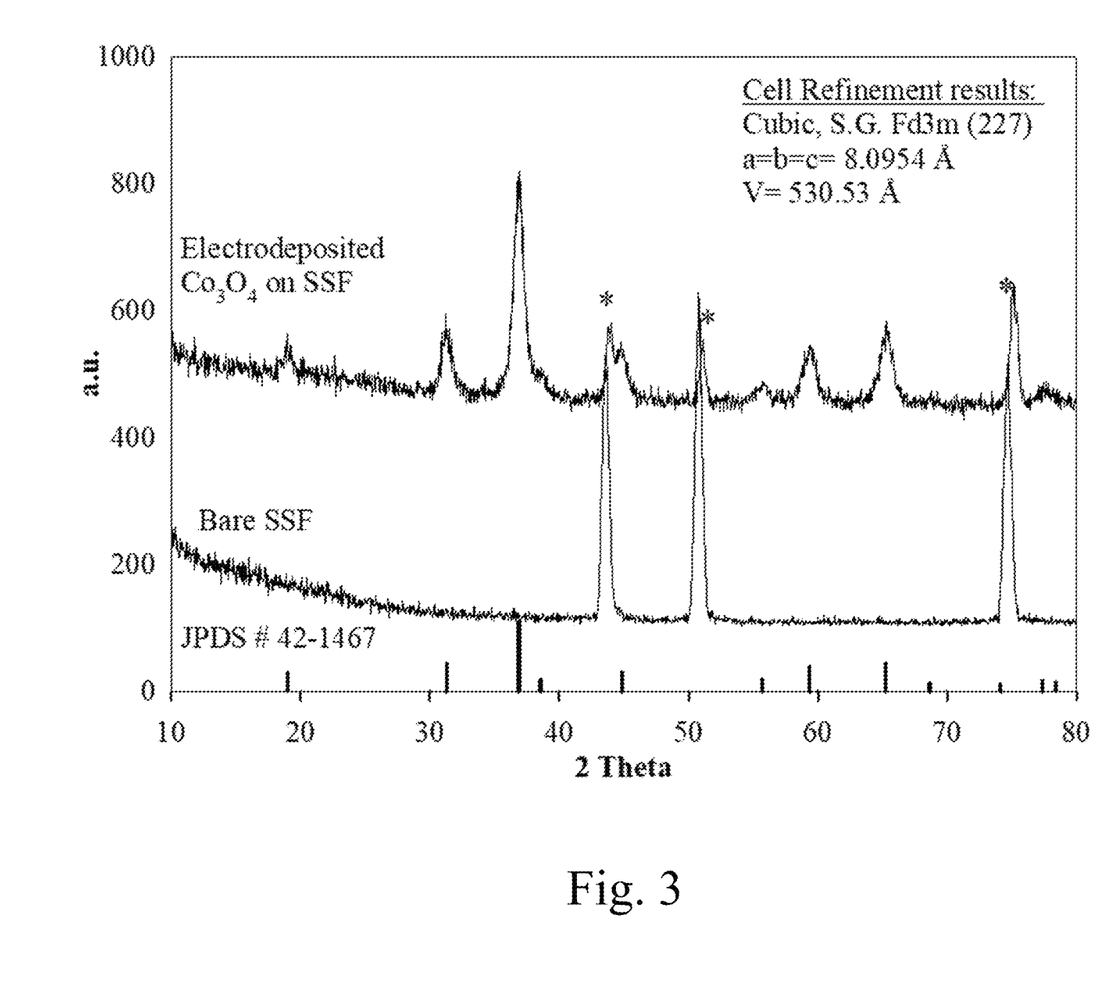
FIG. 3. XRD patterns of $Co_3O_4$ nano-flakes plated on SSF and after heat treatment at 450° C. Asterisks show the peaks from pure SSF.

After electroplating metal oxide on the working electrode, the electrode is quickly rinsed with deionized water thoroughly to ensure no residual KOH or NaOH salts remain. Since $CoOH_2$ is not soluble in water, a chelating agent, such as citric acid, would help to dissolve $Co^{2+}$ If $CoOH_2$ traces are not removed, during heat treatment this would form another type of $Co_3O_4$ particles that are not formed during electroplating. Removal of $Co^{2+}$ ions can be simply done by immersing the electrode into an approximately 0.4M citric acid aqueous solution for 1 minute. The rinsing can also be performed by using pure eutectic solution, where no Co species are present, to dissolve the $CoOH_2$ particles dried on the working electrode. At the end of either rinsing procedure, a warm water rinse is performed where the electrode is left in warm water for 20 minutes in order for water to diffuse into the pores of the fibers. This ensures full dissolution of any residual LiOH and KOH salts. Subsequently, the electrode was dried in an oven and heated up to 450° C. for 2 h under ambient atmosphere. The heat treatment can go up to higher temperatures as long as the substrate is stable. Applicants have treated the samples from 300° C. to 600° C. and found the optimum temperature to be around 450° C. FIG. 3 portrays the XRD patterns of the final $Co_3O_4$ nano-flakes electroplated onto SSF. It has a cubic crystal structure with a phase group of Fd3m and all diffraction peaks can be indexed with the standard Joint Committee on Powder Diffraction Standards (JCPDS) card no. 42-1467. The peak broadening seen in the pattern is due to nano-sized $Co_3O_4$ flakes. The XRD patterns of bare SSF and $Co_3O_4$ plated SSF showed that the peaks corresponding to plain SSF are shifted towards to higher degrees suggesting lattice shrinkage of SSF. This is due to the heat treatment of SSF at 450° C. for 2 h and exposure to the oxidative nature of molten salt.

Figure 4:
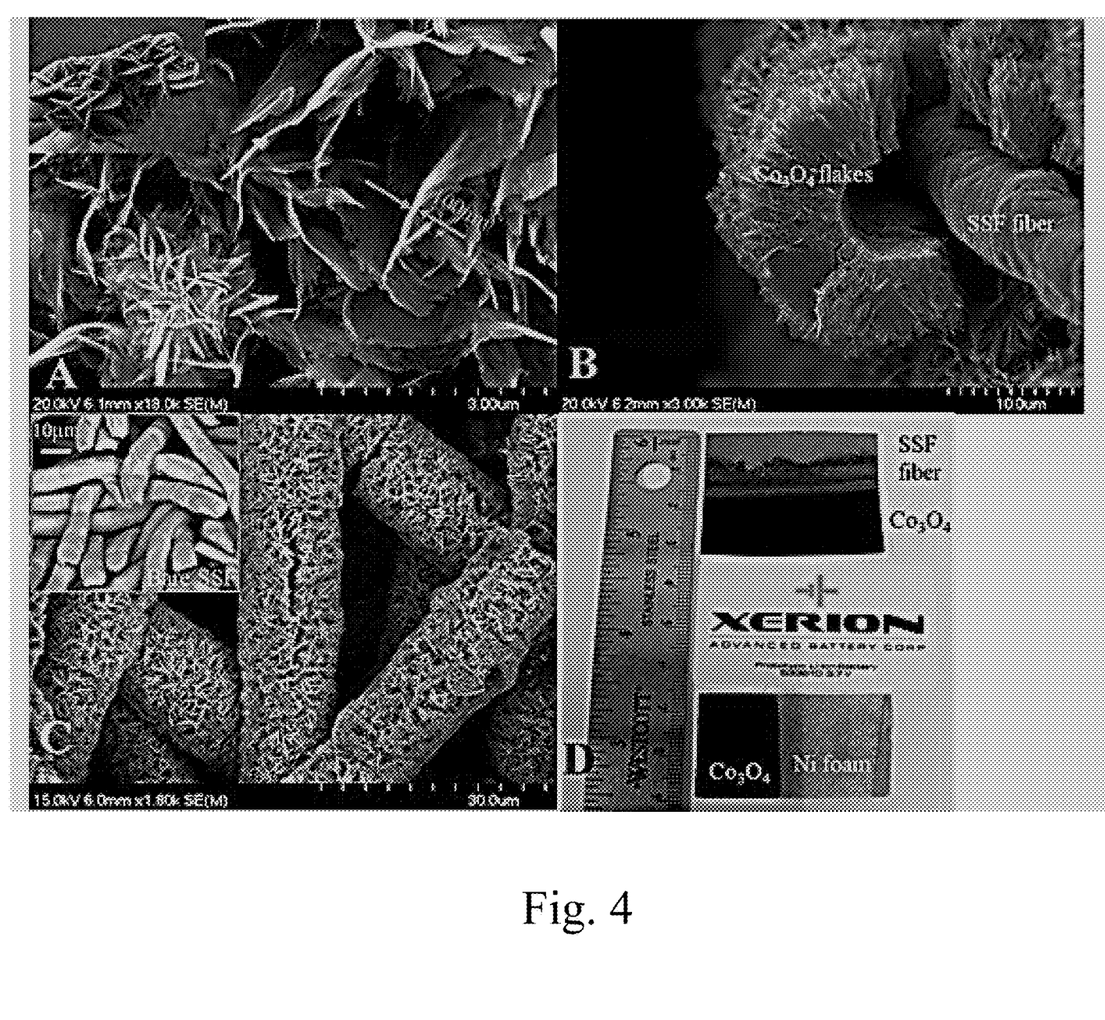
FIG. 4. A-) HRSEM figure of $Co_3O_4$ nano-flakes obtained from KOH/NaOH eutectic bath and heat treated at 450° C. B-) An image showing the fiber and interconnected $Co_3O_4$ nano-flakes. C-) A HRSEM figure showing conformal plating of $Co_3O_4$ across the electrode. See the far bottom fibers. Inset figure shows the bare SSF before electroplating. D-) Photographs of the electroplated SSF and Ni foam.

FIG. 4 contains several High-Resolution Scanning Electron Microscopy (HRSEM) images along with optical photographs of the final products with different substrates. FIG. 4A displays desert rose like flakes that are connected to each other. The figure revealed that flakes have 100 nm wall thicknesses. Higher deposition potentials lead to larger crystalline sizes and thereby higher surface areas. Higher temperature and higher ion concentration can also lead to higher nucleation of metal oxide. FIG. 4B shows the coating thickness which was calculated to be around 10 μm, which lead to high power densities. FIG. 4C shows the conformal $Co_3O_4$ plating on SSF. Images of the fibers collected at different depth of fields (located far behind the front fibers) showed $Co_3O_4$ active materials. Inset figure of FIG. 4C shows the HRSEM image of plain fibers.

One aspect of this invention is also elimination of conductive carbon and polymeric binder additives where both additives decrease volumetric energy densities of the battery. In addition, they increase the production cost of active materials for Li-ion batteries. Although Applicants prefer to utilize 3D stainless steel fiber scaffolds as a working electrode, it can be any geometrical shape as long as it is conductive. A conductive electrode is required in order for electron transfer. For example, the following materials can be used as working electrodes: Ni foil, commercial Ni foam, Ni—Cr mesh, stainless steel, platinum, and copper foils. Having such flexibility to choose working electrode during electroplating allows this technique to be implemented in currently used commercial production lines immediately. FIG. 4D presents two 3D scaffolds, namely SSF and Ni foam, which are electroplated with $Co_3O_4$ nano-flakes. One can also synthesize powder form of metal oxide on a metal substrate, highly conductive graphite, or polymeric components. After deposition the materials can be scraped off and grinded for further processing.

One example to obtain $Co_3O_4$ is to mix 110 g KOH, 50 g NaOH and 8 g $CoOH_2$ together and heat up to 170° C. under inert atmosphere to prevent hydrolysis of molten salts and oxidation of $Co^{2+}$. For this purpose, Applicants used a glove box specially designated for electroplating experiments. Using the same setup, it is also possible to produce the same metal oxide outside of the glove box with an inert atmosphere (supplied by either nitrogen or Argon gases) pressure more than 1 atm. The pressure is an important factor as it will disable any hydrolysis of KOH or LiOH salts or oxidation of $CoOH_2$ species present in the molten salt. Similar to $Co_3O_4$, different Mn based oxides ($Mn_xO_y$) were produced also with the same eutectic mixture except that $CoOH_2$ was replaced with $MnCl_2$. Depending on the applied potential, different forms of manganese oxides can be obtained. Among the Mn oxides having higher than $Mn^{2+}$ oxidation state, $MnO_2$ is the most stable in the air. However, one can obtain $Mn_3O_4$ or $Mn_2O_3$ as well by changing the deposition parameters. The $MnCl_2$ source can be replaced with $MnSO_4$, MnOOH, $Mn_2O_3$ or MnO. Instead of applying anodic electrodeposition (1.2V versus Co metal pseudo reference electrode), cathodic electrodeposition of $MnO_2$ can also be attained. In the presence of $KMnO_4$, $Mn^{7+}$ ions can be reduced to $Mn^{4+}$ and form $MnO_2$ by applying cathodic potential of 1.2V versus Co metal. Many transition metals can be doped into Mn or Co based metal oxides with the appropriate stoichiometry. These transition metals can be Al, Fe, Cr, Ti, Ni, V, Cu, Zn or other non-transition metals like Mg and Ca. A low temperature environment is crucial as this will lead to working electrode options to expand and protect the electrode from adverse effect of high temperature.

Figure 5:
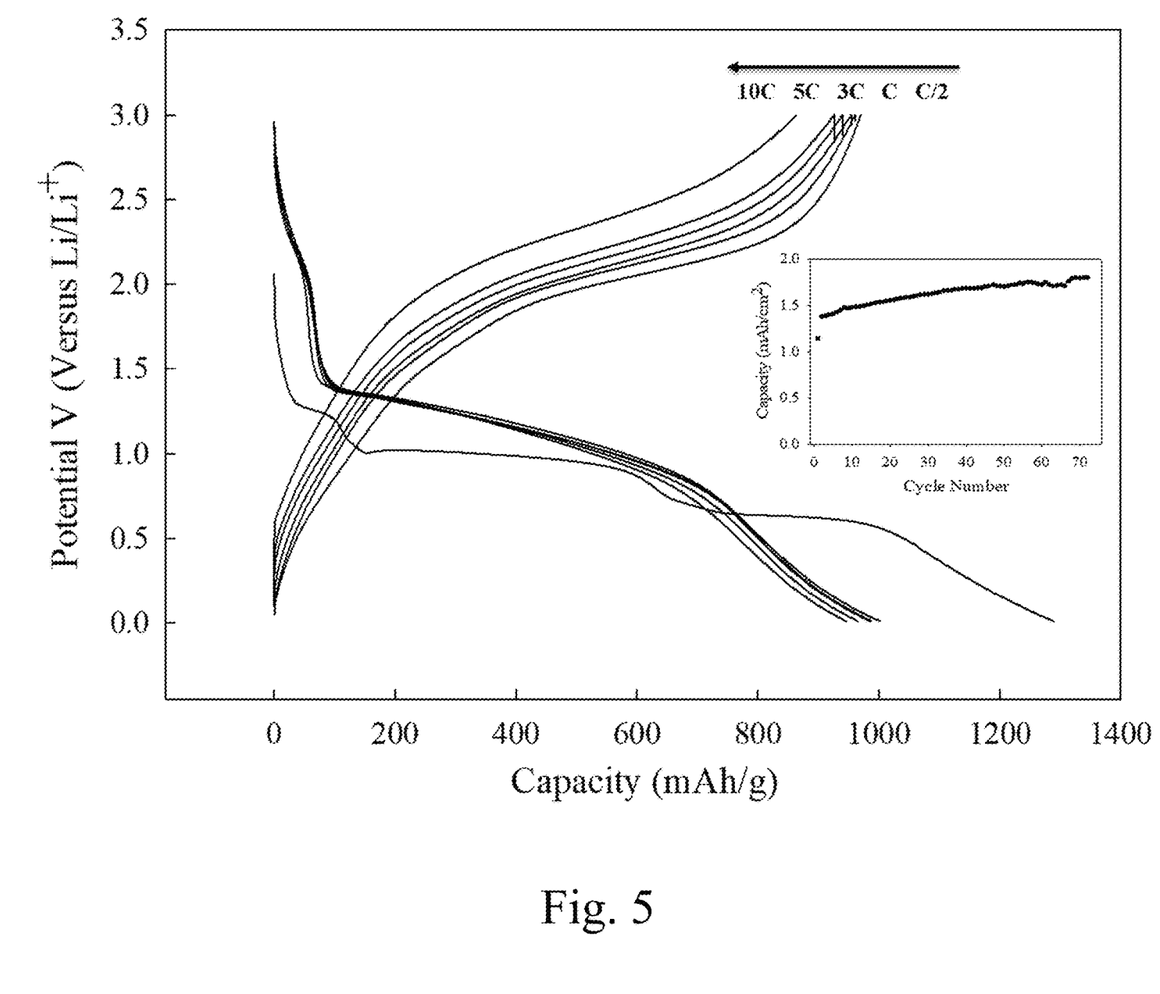
FIG. 5. Charge-discharge profiles of $Co_3O_4$ containing half-cell constructed in a coin cell versus Li foil. The cell was cycled between 0.01V and 3V at different rates showing excellent power capabilities. Inset figure shows stable cycle life of the battery for the 70 cycles.

In one experiment, Applicants employed stainless steel fibers (SSF) as the 3D scaffold working electrode. The plating procedure is as follows: 1.2V (versus $Co/Co^{2+}$) voltage pulses for 1 s on-time followed by 2 minutes rest between each voltage pulses. This ensured transition metal ions to diffuse inner pores of 3D scaffold leading to conformal plating. Approximately, 10 cycles of these pulse plating cycles resulted in a 2 mAh/cm² loading electrodes with around 1200 mAh/g specific capacity, i.e. more than 90% capacity of reported practical values in the literature referenced in this provisional patent application. If any of the plating parameters are changed, the electrochemical performance of final product would change dramatically. For example, if the rest time between each pulse is 1 minute then the conformal plating is not achieved leading to poor electrochemical performance. The electrochemical charge and discharge profiles of $Co_3O_4$ on SSF were plotted in FIG. 5. The coin cell was constructed with $Co_3O_4$ anode deposited onto SSF versus Li foil and separated with a commercially available 25 um polymer separator. The conventional electrolyte was used which has the formulation of 1.15M $LiPF_6$ salt dissolved in EC/EMC/DEC at the ratio of 20/60/20 v/v. The lithiation and delithiation potentials are in agreement with practical potentials reported by G. Huang, S. Xu, S. Lu, L. Li, H. Sun, *ACS Applied Materials & Interfaces*, 6, 7236 (2014). Color coded charge-discharge profiles in FIG. 5 displays the different $Co_3O_4$ delithiation C-rates. A C-rate is a measure of the rate at which a Li-ion battery is discharged or charged relative to its practical capacity. For example 1C charge rate means that the charge will take 1 hour or 2C charge rate means that the charge will take 30 minutes. Even at high rates (10C-discharging in 6 minutes) the material holds 80% of the initial capacity, an outstanding feature compare to available literature reported by Z.-S. Wu, W. Ren, L. Wen, L. Gao, J. Zhao, Z. Chen, G. Zhou, F. Li, H.-M. Cheng, *ACS Nano*, 4, 3187 (2010), X. Hu, H. Huang, J. Zhang, J. Shi, S. Zhu, N. Su, *RSC Advances*, 5, 99899 (2015), Y. Fan, H. Shao, J. Wang, L. Liu, J. Zhang, C. Cao, *Chemical Communications*, 47, 3469 (2011) and N. Yan, L. Hu, Y. Li, Y. Wang, H. Zhong, X. Hu, X. Kong, Q. Chen, *The Journal of Physical Chemistry C*, 116, 7227 (2012). Inset figure of FIG. 5 exhibits excellent cycle life in a half cell where almost no capacity fade was observed at C/2 rates (slow rate is usually used for cycle life assessments as it correctly establishes the structural robustness). This electrode delivers approximately 2 mAh/cm² practical capacity.

Figure 6:
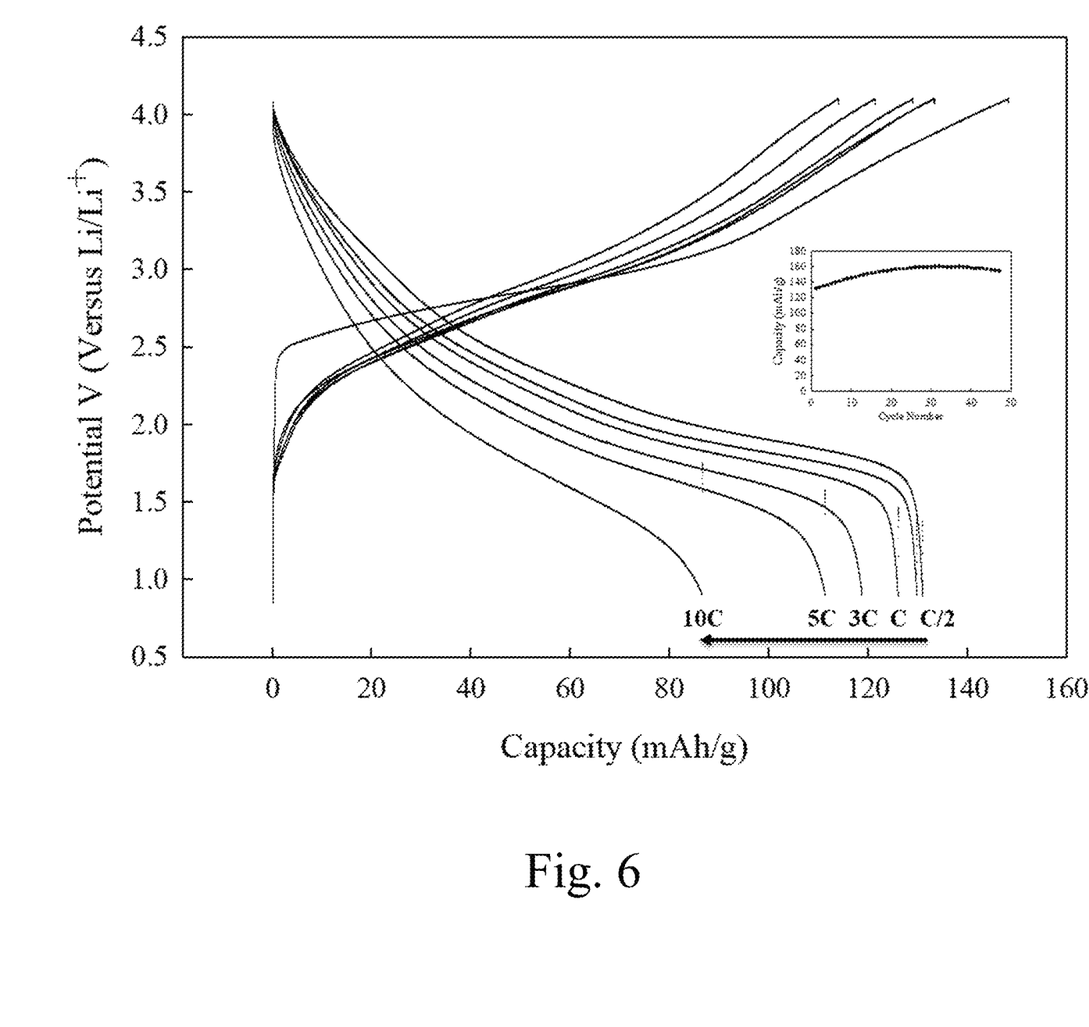
FIG. 6. Cycling and power capabilities of a full Li-ion cell employing electroplated $LiCoO_2$ and $Co_3O_4$ electrodes exhibiting outstanding power capabilities and cycling.

In another example, a Co based full cell was assembled employing an electroplated $LiCoO_2$ cathode and a pre-cycled $Co_3O_4$ anode. Pre-cycling was a necessary step to avoid Li plating which exacerbates the cycle life of the battery even in the first 10 cycles. As can be seen from FIG. 6, the output potential of the battery is around 2-2.2V during discharge. This potential can be used for chip and optic industries where less than 2.5V output potentials are required. Currently, these industries are employing either NiMH or NiCd low voltage (1.2V) secondary batteries. Ni based batteries are toxic in addition to their memory effect which necessitates frequent full discharge and possess high self-discharge which requires recharging after storage. Power tests revealed that 70% specific capacity was retained at 10C (6 minutes discharge). Cycle life tests were carried out for around 50 cycles and no capacity degradation was observed. This can be seen in the inset of FIG. 6.

In another example, the molten salt is achieved only by melting NaOH, the final product will form sodiated metal oxides which are receiving great attention as they can be used as cathode materials for Na-ion batteries. The Co source could be CoO, $CoOH_2$, $CoCl_2$, $CoSO_4$, or $Co(NO_3)_2$ salts. In one example, 50 g NaOH, and 0.5 g $CoOH_2$ are added to the bath and monitored until they are dissolved thoroughly. The color of the melt changed from transparent color to blue as the divalent $Co^{2+}$ ions are coordinated by hydroxide ions. This is followed by immersing the 3-electrode lid into the molten salt. Afterwards, 1.2V (versus cobalt wire reference electrode) potential pulses were applied. The pulse range is from 100 μs to 20 s where a SSF, Ni foil and Co wire are used as working, counter, and pseudo reference electrodes, respectively. Between pulses, there was an open circuit voltage period (ranging from 3 s to 2 minutes). This resting period allows ions to move into the voids of SSF, so that conformal deposition can be achieved. The number of deposition cycles (duty cycle refers to on/off time) determines the loading of the sample. Changing the applied potential (starting from 0.6V to 1.4V) will lead to different stochiometric sodiated metal oxide. Similarly, in another example, 50 g NaOH, and 0.5 g $MnCl_2$ are added to the bath and monitored until they are dissolved thoroughly. 1.2V (versus cobalt wire reference electrode) potential pulses were applied. The pulse range is from 100 μs to 20 s where a SSF, Ni foil and Co wire are used as working, counter, and pseudo reference electrodes, respectively. Between pulses, there was an open circuit voltage period (ranging from 3 s to 2 minutes). This resting period allows ions to move into the voids of SSF, so that conformal deposition can be achieved. One can tune the plating parameters e.g. constant or pulse voltages, constant or pulse currents or combination of them in order to achieve different morphology and structure of the final material.

Figure 7:
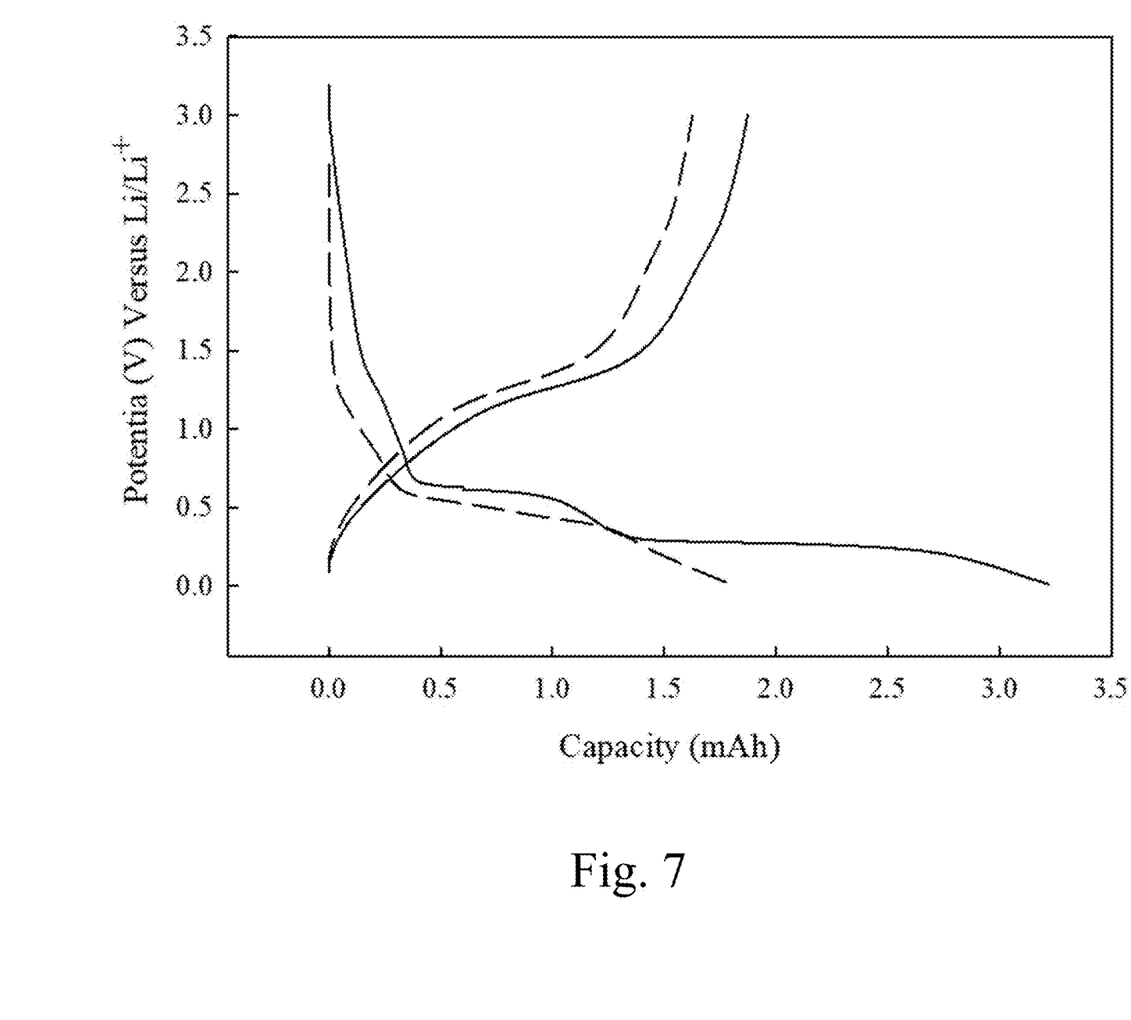
FIG. 7. Charge-discharge profiles of electroplated Mn based anode cycled versus Li metal. The electrode cycled between 0.01V and 3V potentials at C/2 rate. First and second cycles were shown in solid and long dashed lines, respectively.

Mn-based transition metal oxide was also obtained in another embodiment of the present invention. In order to obtain $MnO_2$, 110 g KOH, 50 g NaOH and 8 g $MnCl_2$ was mixed together and heated up to 170° C. under inert atmosphere. The plating procedure is as follows: 1.2V (versus $Co/Co^{2+}$) voltage pulses for is on-time followed by 2 minutes rest between each voltage pulses. This ensured transition metal ions to diffuse into inner pores of the 3D scaffold leading to conformal plating. One striking feature of Mn-based anode material is that it has lower lithiation potential which ultimately increases the output potential of a full cell favoring its application even to consumer electronics. FIG. 7 shows the voltage profiles of the first (black) and second (red) cycles of $Mn_3O_4$ electrode tested versus Li foil in a coin cell. The potentials and capacities resemble the data reported by Jie Yue, Xin Gu, Liang Chen, Nana Wang, Xiaolei Jiang, Huayun Xu, Jian Yang and Yitai Qian, *J. Mater. Chem. A*, 2014, 2, 17421-17426. Based on the aforementioned $Mn_3O_4$ studies, a 3V output potential is anticipated if employed in a full cell versus $LiCoO_2$. Although the conductivity, and hence the power capabilities of Co based anode materials are better than Mn-based ones, the lower lithiation potential provides much higher output potentials. Applicants are synthesizing Mn—Co composites that are expected to have low lithiation potentials without compromising the power capabilities. Other transition metal doping, such as $Al^{3+}$, and metal ion doping, e.g. $Mg^{2+}$, Ti' can further stabilize the structure.

Figure 8:
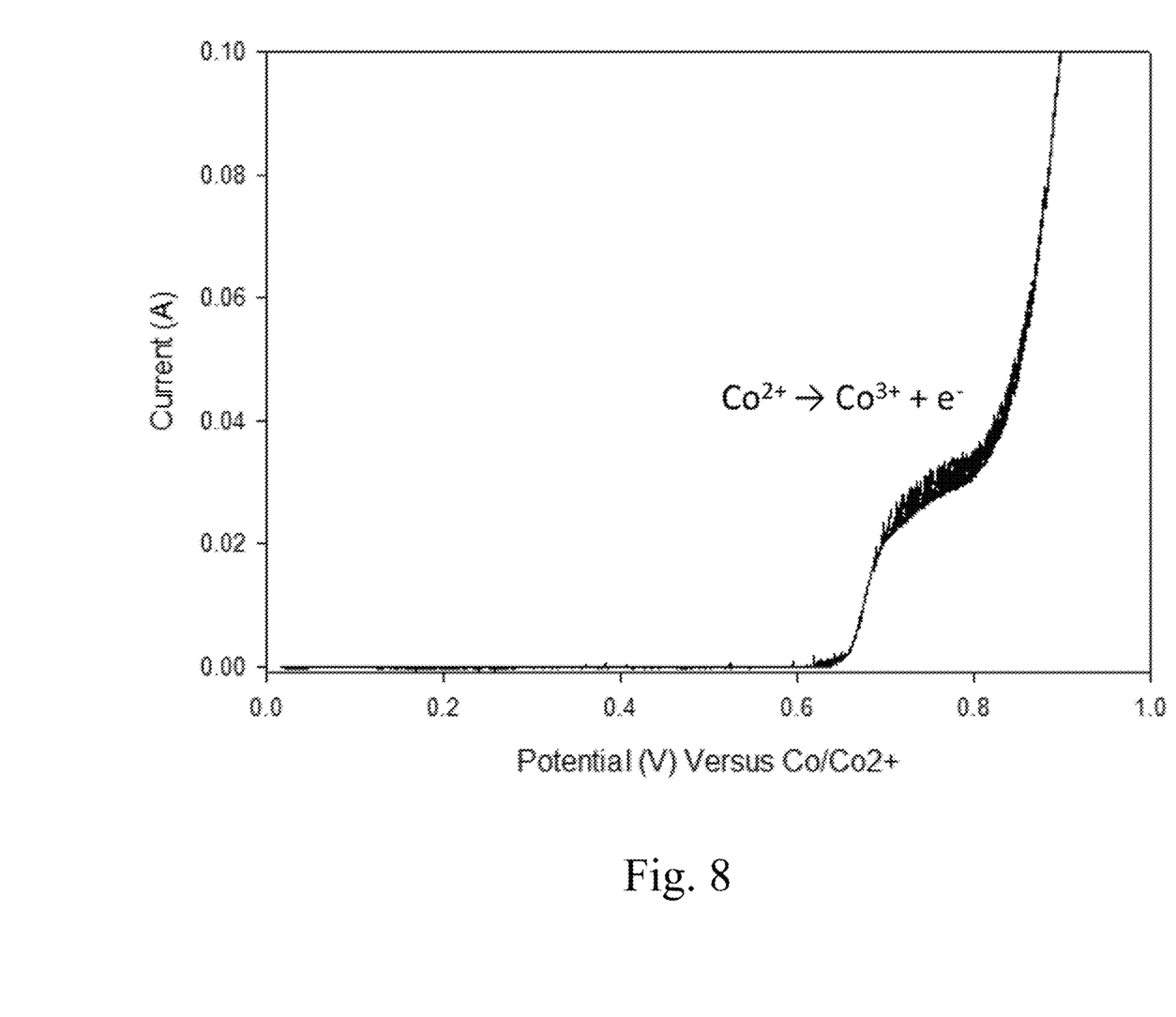
FIG. 8. Cyclic voltammetry of NaOH/KOH bath containing 50% pure $Co(OH)_2$ at 5 mV/s scan rate at 170° C.
Figure 9:
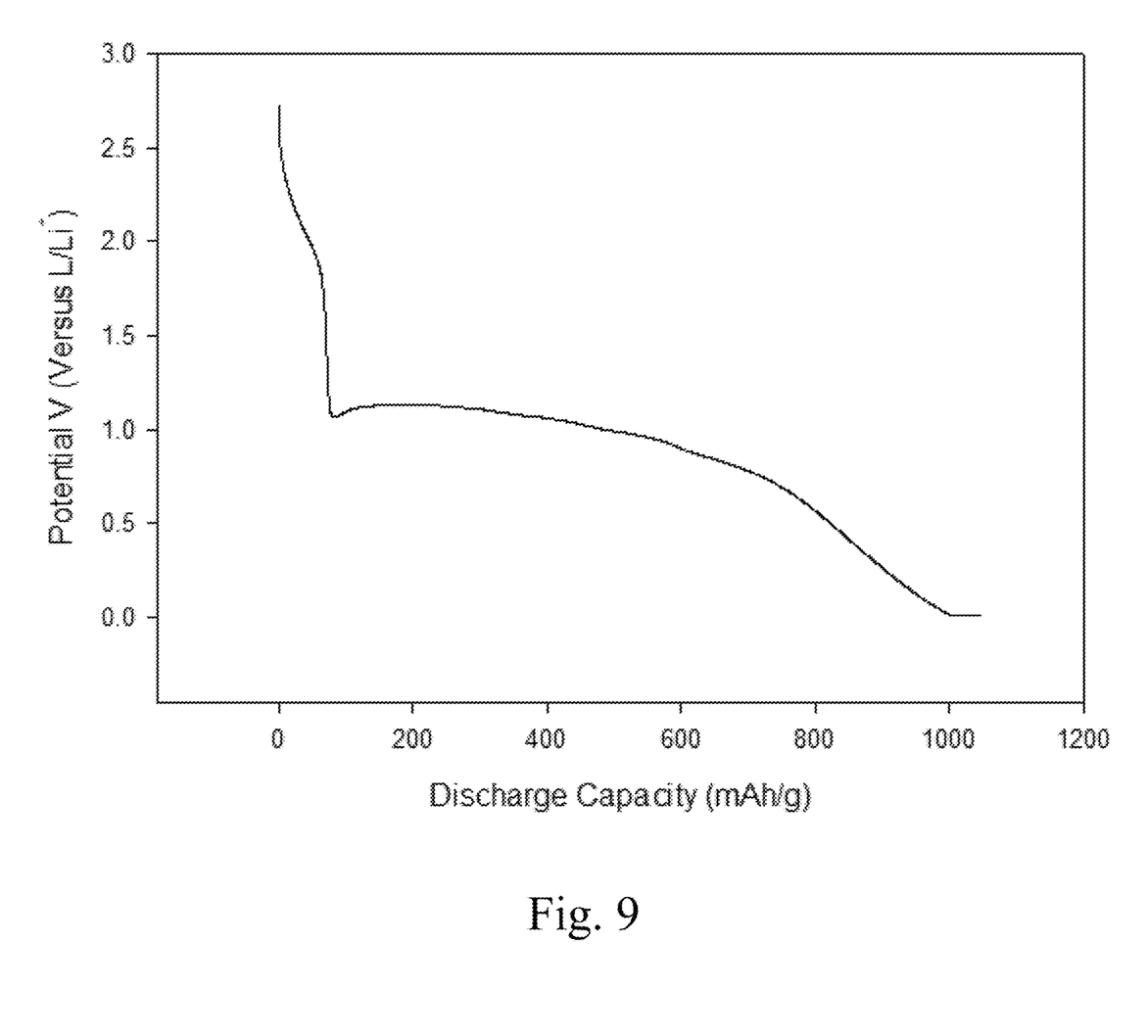
FIG. 9. Charge-discharge profiles of $Co_3O_4$ obtained from low purity $Co(OH)_2$ precursor. The half-cell constructed in a coin cell versus Li foil. The cell was cycled between 0.01V and 3V.

In another example, FIG. 8 shows the CVs of two NaOH/KOH molten salt systems containing low purity (50%) of $Co(OH)_2$ in which the impurities were 25% $CoSO_4$, 25% $MgOH_2$ in which the bath temperature was set to 170° C. The plating procedure is as follows: 1.2V (versus $Co/Co^{2+}$) voltage pulses for is on-time followed by 2 minutes rest between each voltage pulses. This ensured transition metal ions to diffuse inner pores of 3D scaffold leading to conformal plating. Approximately, 10 cycles of these pulse plating procedures resulted in a 2 mAh/cm² loaded electrodes with around 1200 mAh/g specific capacities, i.e. more than 90% capacity of reported practical values in the literature referenced in this provisional patent application. The 50% pure $Co(OH)_2$ powders were prepared by mixing 98% $Co(OH)_2$ powders with the appropriate percentages of $CoSO_4$ and $Mg(OH)_2$, commonly found impurities in $Co(OH)_2$ (see *Processing Considerations for Cobalt Recovery from Congolese Copperbelt Ores*, B Swartz, S. Donegan, S. Amos, Hydrometallurgy Conference 2009, The Southern African Institute of Mining and Metallurgy, 2009). The weight percentages of the $CoSO_4$ and $Mg(OH)_2$ impurities were 1/1. In the CV study, the Pt foil working electrode is employed to evaluate if there is any side reactions stemming from impurities of $Co(OH)_2$ precursors. As can be seen from CV profile, $Co^{2+}$ ions are started to be oxidized at relatively similar potentials of the bath containing highly pure $CoOH_2$ i.e. above 0.6V. Both CV profiles in FIGS. 8 and 1 resemble each other suggesting that no impurities are present during electroplating. As can be seen from FIG. 9, discharge capacity of $Co_3O_4$ electrode obtained from low impurity of $Co(OH)_2$ delivered identical values which is around 1000 mAh/g in the second cycle. Voltage profiles, also resembled each other suggesting that $CoSO_4$ and $Mg(OH)_2$ impurities do not have adverse effect on the final product of $Co_3O_4$. The electrochemical discharge profiles of $Co_3O_4$ plated from low purity $CoOH_2$ precursor on SSF were plotted in FIG. 9. The coin cell was constructed with $Co_3O_4$ anode deposited onto SSF versus Li foil and separated with a commercially available 25 um polymer separator. The conventional electrolyte was used which has the formulation of 1.15M $LiPF_6$ salt dissolved in EC/EMC/DEC at the ratio of 20/60/20 v/v. The lithiation and delithiation potentials bode well with the $Co_3O_4$ anode that was obtained from high purity $CoOH_2$ precursors.

In conclusion, the technique described above has several advantages and these are listed below:

It eliminates the use of binder and conductive carbon additives which increases the volumetric energy density of the battery Provides faster way to obtain final electrode to be utilized in battery applications. One can get the final product in less than 20 minutes.

Can convert metal hydroxide precursors to metal oxide counterparts (e.g. $CoOH_2$—$Co_3O_4$) at temperatures as low as 150° C.

By just changing the voltage and deposition parameters, this technique allows for tailoring the morphology and texture of desired metal oxide.

Single step synthesis which phases out any intermediate steps reported in above articles. These steps increase the manpower need and hence cost.

Preserving stable voltage and capacities, and high power capabilities of a battery without conductive additives.

Side products of the synthesis is 99.9% Co metal which can be channeled to other applications for industrial purposes.

Since the electroplating is element specific, the precursors do not need to be high purity, a requirement for conventional methods which spikes up the cost of the product.

What is claimed is:

1. An anode structure comprising a conformal coating of a transition metal oxide formed by electrodepositing, in the presence of inert atmosphere, an electrochemically active transition metal oxide onto a surface of a working electrode from a molten salt electrolyte having the working electrode immersed therein, the molten salt electrolyte comprising a transition metal ion source, NaOH, and KOH,
wherein the transition metal oxide is selected from the group consisting of aluminum oxide, copper oxide, chromium oxide, cobalt oxide, manganese oxide, nickel oxide, silver oxide, gold oxide, tin oxide, platinum oxide, zinc oxide, tungsten oxide, tantalum oxide, rhodium oxide, molybdenum oxide, titanium oxide, iron oxide, zirconium oxide, vanadium oxide, hafnium oxide, and mixtures thereof.

2. The anode structure of claim 1, wherein the transition metal oxide is $Co_3O_4$, CoO, $MnO_2$, $Mn_2O_3$, $Mn_3O_4$ or a mixture of Mn and Co metal oxide $Mn_xCo_yO_z$ where x, y and z range from 0.1 to 4.

3. The anode structure of claim 1, wherein the molten salt electrolyte further comprises a halide salt, a nitrate salt, a sulfate salt or a combination thereof.

4. The anode structure of claim 3, wherein the molten salt electrolyte comprises at least one of (i) a further hydroxide salt selected from the group consisting of RbOH, and CsOH, (ii) a halide salt selected from the group consisting of KF, KCl, NaCl, NaF, NaBr, KBr, NaI, KI, and $AlCl_3$, (iii) a nitrate salt selected from the group consisting of $NaNO_3$, and $KNO_3$, (iv) a nitrite salt selected from the group consisting of $NaNO_2$, and $KNO_2$, and (v) a sulfate salt selected from the group consisting of $Na_2SO_4$, and $K_2SO_4$.

5. The anode structure of claim 1 wherein the molten salt electrolyte comprises NaOH and $Co(OH)_2$, and the electrodeposited transition metal oxide comprises $Na_xCo_yO_2$, wherein x is between 0.1 to 1 and y is between 1 to 0.1.

6. The anode structure of claim 1, wherein the molten salt electrolyte comprises NaOH and $MnCl_2$, and the electrodeposited transition metal oxide comprises $Na_xMn_yO_2$, wherein x is between 0.1 to 1 and y is between 1 to 0.1.

7. The anode structure of claim 1, wherein the working electrode comprises an electrically conductive material selected from the group consisting of electrically conductive carbon, metal, metal alloys, metallic ceramics, oxides, polymers, and combinations thereof.

8. The anode structure of claim 3, wherein the working electrode comprises an electrically conductive material selected from the group consisting of electrically conductive carbon, metal, metal alloys, metallic ceramics, oxides, polymers, and combinations thereof.

9. The anode structure of claim 4, wherein the working electrode comprises an electrically conductive material selected from the group consisting of electrically conductive carbon, metal, metal alloys, metallic ceramics, oxides, polymers, and combinations thereof.

10. The anode structure of claim 7, wherein the working electrode is an electrically conductive metal selected from the group consisting of aluminum, copper, chromium, cobalt, manganese, nickel, silver, gold, tin, platinum, zinc, tungsten, tantalum, rhodium, molybdenum, titanium, iron, zirconium, vanadium, hafnium, and the alloys thereof.

11. The anode structure of claim 1, wherein the transition metal ion source comprises at least one of cobalt, manganese, nickel, copper, iron, chromium, vanadium, titanium, molybdenum, tungsten, and combinations thereof.

12. The anode structure of claim 1, wherein the working electrode is a porous nanostructured component and wherein the transition metal oxide is conformally coated onto the porous nanostructured component.

13. The anode structure of claim 12, wherein the working electrode used for electrodeposition of the transition metal oxide is porous with 3D interconnected pore structures.

14. The anode structure of claim 1, wherein the electrochemically active transition metal oxide is electrodeposited onto the surface of the working electrode from the molten salt electrolyte at a temperature in excess of the melting temperature of the molten salt electrolyte.

15. The anode structure of claim 14, wherein the electrodeposition temperature is in a range of from 150° to 600° C.

16. The anode structure of claim 15, wherein the electrodeposition temperature is in a range of from 300° to 500° C.

17. The anode structure of claim 1, wherein the thickness of the electrodeposited transition metal oxide ranges from 10 nm to 100 μm.

18. The anode structure of claim 1, wherein the electrodeposited transition metal oxide is in the form of a powder and wherein the powder can be scraped off.

19. An energy storage device comprising the anode structure of claim 1.

20. A primary or secondary battery comprising the anode structure of claim 1.

21. The anode structure of claim 1, wherein the electrodeposited transition metal oxide comprises $Co_3O_4$, and wherein nano-flakes of the $Co_3O_4$ deposited onto the working electrode comprise an X-ray diffraction pattern substantially corresponding to that of FIG. 3.

22. The anode structure of claim 1, wherein the conformal coating of the transition metal oxide comprises a substantially uniform coating that is substantially absent isolated particles at edges of the working electrode.

23. The anode structure of claim 1, wherein the electrodeposited transition metal oxide comprises interconnected nano-flakes of $Co_3O_4$.

24. The anode structure of claim 23, wherein the nano-flakes of the $Co_3O_4$ deposited onto the working electrode comprise desert rose like shapes substantially corresponding to those in the High-Resolution Scanning Electron Microscopy (HRSEM) image of FIG. 4A.

25. A battery cell comprising the anode structure of claim 1, wherein the anode structure retains at least 70% of its initial specific capacity when discharged at a discharge rate of 10C as compared to at a discharge rate of C/2.

26. A battery cell comprising the anode structure of claim 1, wherein the anode structure exhibits substantially no specific capacity fade over 50 cycles of charging and discharging the battery cell at a C/2 rate.

27. A battery cell comprising the anode structure of claim 1, wherein electrochemical charge and discharge profiles of the battery cell at 10C, 5C, 3C, C and C/2 substantially correspond to those shown in FIG. 5 or FIG. 6.

28. A battery cell comprising the anode structure of claim 1, wherein the electrodeposited transition metal oxide is electrodeposited from a transition metal ion source having a purity as low as 50%.

29. The battery cell according to claim 28, where the battery cell exhibits a voltage profile upon cycling that is substantially equivalent to that of a comparison battery cell having the anode structure of claim 21 and comprising the electrodeposited transition metal oxide as electrodeposited from a substantially pure transition metal ion source.

* * * * *